(12) United States Patent
Guo

(10) Patent No.: US 7,457,868 B1
(45) Date of Patent: Nov. 25, 2008

(54) METHODS AND APPARATUS FOR MEASURING NETWORK PERFORMANCE

(75) Inventor: Qing Guo, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 959 days.

(21) Appl. No.: 10/749,114

(22) Filed: Dec. 30, 2003

(51) Int. Cl.
*G06F 13/00* (2006.01)

(52) U.S. Cl. .................... 709/224; 709/214; 709/223; 709/203

(58) Field of Classification Search ............. 709/203, 709/223–224; 370/516
See application file for complete search history.

(56) References Cited

U.S. PATENT DOCUMENTS

| | | | |
|---|---|---|---|
| 6,078,919 A * | 6/2000 | Ginzburg et al. | 707/10 |
| 6,711,171 B1 * | 3/2004 | Dobbins et al. | 370/400 |
| 6,868,094 B1 * | 3/2005 | Bordonaro et al. | 370/516 |
| 7,096,263 B2 * | 8/2006 | Leighton et al. | 709/224 |
| 7,111,061 B2 * | 9/2006 | Leighton et al. | 709/224 |
| 7,127,508 B2 * | 10/2006 | Edmison et al. | 709/224 |
| 7,251,688 B2 * | 7/2007 | Leighton et al. | 709/224 |
| 2002/0124080 A1 * | 9/2002 | Leighton et al. | 709/224 |
| 2002/0129134 A1 * | 9/2002 | Leighton et al. | 709/223 |
| 2002/0143888 A1 * | 10/2002 | Lisiecki et al. | 709/214 |
| 2002/0147774 A1 * | 10/2002 | Lisiecki et al. | 709/203 |

* cited by examiner

*Primary Examiner*—Jeffrey Pwu
*Assistant Examiner*—Sulaiman Nooristany
(74) *Attorney, Agent, or Firm*—Chapin IP Law, LLC

(57) ABSTRACT

An initiator agent and target agent exchange measurement and response messages to determine the performance of a network supporting communication between the initiator agent and the target agent. The initiator agent creates and transmits measurement packets in a measurement packet group to the target agent. The measurement packet include one or more performance metrics created by the initiator agent such as timestamp information and sequencing information. The target agent receives the measurement packets, perform calculations of network performance metrics in generates corresponding response packets that are forwarded back to the initiator agent. The initiator agent receives the response packets and uses parameter information contained therein to calculate network link performance metrics such as one-way and round-trip packet latency of measurement and response packets as well as packet loss performance metrics for one-way and round-trip packet propagation between the initiator and target agents. Payload data within the measurement and response packets simulates application data traffic.

28 Claims, 8 Drawing Sheets

METHODS AND APPARATUS FOR MEASURING NETWORK PERFORMANCE

Conventional computer networking environments support the exchange of data between interconnected computerized devices using a variety of data communications mechanisms. When computerized devices communicate over a data communications network, various factors can affect the performance and integrity of such communications. As an example, if two computer systems communicate over a computer network such as the Internet, high volumes of data communications traffic (i.e., data communications packets) present within the Internet originating from a variety of different computer systems can cause conditions such as congestion in portions of the network in which data communications traffic (i.e., packets) are delayed within the network infrastructure. In some cases, the delay may be minimal and data communications protocols operating within two communicating computer systems can allow for the packet delay to occur within the network without disrupting data communications applications that are dependent upon such communications. In other situations however, packet delay within a network may result in a timeout condition for one or both computer systems performing communications with each other. Such timeout conditions can adversely affect the operation of the data communications applications executing within those computer systems and cause entire computer systems to become disrupted.

Packet loss is another type of network condition that can exist in conventional data communications network that may cause communications between two computer systems to be disrupted as well. As an example, a malfunctioning data communications device such as a switch or router within a network may improperly discard or drop data communications packets being transferred between two computer systems. Packets of communications that may be lost in this manner may require the originator of the packet to retransmit a replacement packet thus further contributing to consumption of available network bandwidth (and possibly adding to network congestion, if present). If packet loss rates become too high within a network, software applications executing on computer systems may be unable to properly operate. There are many other potential scenarios that can exist in conventional communications networks that can affect communications packet latency and communications packet loss.

There are a number of conventional software applications designed to provide a user of the computer system with a measurement of network performance characteristics such as packet latency and packet loss rates of communications transmitted within a data communications network. A conventional protocol called Internet Control Message Protocol (ICMP) is widely used within such conventional network performance monitoring applications in order to measure network performance characteristics such as packet latency and loss rates.

As an example, a conventional software program called "ping" can operate on the computer system to transmit a series of ICMP ping packets from one computer system to another. The responding computer system that receives a ping packet provides a ping response back to the computer system that originated the ping packet. Upon receipt of the ping response packet, the computer system that originated the ping packet can calculate the difference in time between the time the original ping packet was transmitted and the time the ping response was received thus providing a round-trip travel time for that ping packet. Ping can thus provide a user such as a network administrator with an indication if a computerized device that is ping is available on the computer network and further provides a relative approximation all how quickly communications to be exchanged with the remote computer system. In conventional ping application can also keep track of original ping packets that were transmitted to a remote computer system but for which no ping response was received. In this manner, ping can be utilized to determine a rough approximation of packet loss rates between two computer systems.

Network administrators can use another conventional software application called "trace route" to determine a route path through a network from one computer system to another. Trace route operates by sending a series of packets from the originating computer system to a remote computer system. Each successive packet in the trace route packet group contains a time-to-live field (TTL) incremented by a value of one. A TTL value in a packet indicates how many network hubs the packets are to be propagated to within a network prior to being discarded by a data communications device when the TTL field reaches zero. Each network device that receives a trace route packet decrements the time to live field by a value of one (1). A data communications device that decrements the time to live field from a value of one (1) to zero (0) discards the packet. As an example, a trace route packet with a TTL field having a value of three (3) will be propagated through three network devices and will then will be discarded. Each time a network device such as a router or switch discards the trace route packet (i.e., I decrements in its TTL field from one to zero), that router or switch returns an Internet Control Messaging Protocol (ICMP) timeout message back to the originator of the trace route packet that contains the identity of the router, switch or other network device that discarded the trace route packet. In this manner, if the originating computer system transmit a series of the trace route packets onto the computer network address to a remote computer system and each trace route packet has a successively higher valued TTL field, as each trace route packet expires within the network, the originating computer system will receive a series of ICMP timeout that indicate the network identity of each data communications device in the network of a path of the originating device to the remote computer system. By collecting all of the ICMP timeout messages, the originating computer system can identify the entire network path or route between itself and the remote computer system. The trace route application operating on the computer system originating the series of trace route messages can also keep track of round-trip travel time and packet loss rates of each trade route message in relation to its corresponding ICMP timeout message, thus providing an indication of communications latency and packet loss between the two computer systems for that portion of the data communications route.

SUMMARY

Conventional mechanisms to for identifying network performance characteristics such as latency and packet loss rates suffer from a variety of deficiencies. As an example, most of the currently available conventional commercial networks monitoring packages provide network traffic measurement by measuring ICMP traffic. As noted above, conventional ping and trace route facilities operate to generate ICMP packets on monitored communications links or routes and collect the statistics. Therefore, ICMP ping packet loss rates are typically considered as valid or accurate network packet loss rates and ICMP ping or trace route packet latencies are considered as valid measurements of network link delays. However, embodiments of the invention are based in part on an observation that ICMP traffic in a network is not used to pass general or typical application data between applications that require communications with each other. Rather, ICMP packets tend to be quite small in comparison to many types of actual application traffic packets. Accordingly, since ICMP packets are small in size, they may not be processed in a network, as would ordinary application data packets.

In addition, as conventional traffic shaping and quality of service technologies become mature within networks, ICMP traffic is likely to be de-prioritized filtered and even blocked for efficiency and security reasons. Accordingly, acquiring network performance measurements using conventional performance measurement applications that use ICMP traffic does not reflect accurate behavior of network links.

Embodiments of the invention significantly overcome such deficiencies and provide a system, methods and apparatus for determining performance of network links between an initiator agent and target agent operating within respective initiator and target computer systems interconnected via a communications network. Generally, according to operation of embodiments of the invention, the initiator agent creates a series of measurement packets and transmits these measurement packets onto the computer network for receipt by the target agent. In one embodiment, measurement parameter information in each measurement packet includes a respective measurement packet identity such as a sequence number relative to the other measurement packets in the measurement packet group. In addition, each measurement packet includes a group count indicating the total number of packets within the measurement packet group (i.e., total number in this measurement group or sequence). The measurement packets also contain one or more measurement performance metrics such as an initiator timestamp indicating when the initiator agent created and transmitted that measurement packet to the target agent.

The initiator agent and target agent maintain synchronization of measurement time clocks with each other. As such, the target agent receives the measurement packets and computes a measurement packet one-way travel time based on the initiator timestamp in the measurement packet that indicates travel time for the measurement packet between the initiator agent and the target agent. In addition, when all measurement packets of the measurement packet group have been received at the target agent, the target agent computes an average one-way travel time of all measurement packets received within the measurement packet group. The target agent can store this information for reporting purposes.

In addition to calculating one-way travel time of each measurement packet, the target agent generates a corresponding response packet for transmission back to the initiator agent. The target agent can transmit response packets as parts of a response packet group. Each response packet contains response parameter information and includes a copy of the information within its corresponding measurement packet and contains a target processing timestamp generated a target agent. In alternative embodiments of the invention, the response packets also contain calculations such as the one-way travel time of the corresponding measurement packet for the initiator agent to the target agent. In a further alternative embodiment, the last response packet can contain the average one-way travel time for the set of measurement packets received within the measurement packet group.

When the response packets are individually received at the initiator agent, the initiator agent performs calculations such as the one-way travel time for each response packet using the target processing timestamp within the response packet. The target agent also calculates the average one-way travel time from target agent to initiator agent for all packets within the response packet group. In addition, the initiator agent computes a round-trip travel time for a measurement packet to be received by the target agent thus causing the target agent to produce and transmit the corresponding response packet. The initiator agent further computes an average round-trip travel time of the collective set of measurement packets and corresponding response packets.

In addition, embodiments of the invention can compute packet loss metrics. By including sequence numbers and group count information (i.e., a value of N) within the packets exchanged between the initiator and target agents, packets that may get lost within the computer network, such as those discarded or otherwise destroyed by data communications devices can be detected. This allows the initiator and target agent to compute packet loss rates as a percentage of total packets transmitted using sequence number and group count information as will be explained in more detail. Note that in most cases, where no packet loss is experienced, N measurement packets sent will be equal to M response packets received, thus there will be a response packet generated for each measurement packet.

In addition, the packets exchanged between the initiator and target agent contain payload data that defines an associated packet size. By adding payload data to the measurement and response packets of this invention, such packets more closely approximate actual network traffic within the computer network and thus network behavior that may affect packet latency or packet loss will be applied to the measurement and response packets, as it would be to any normal application data traffic.

Using these and other computations, embodiments of the invention provide the ability to accurately detect network performance metrics such as individual and average packet latencies and packet losses for groups of packet exchange between the initiator and target agent computer systems. By periodically performing operation of embodiments of the invention (e.g., once every second with a sequence of ten measurement and response packets), network links can be monitored to determine when network performance is within an acceptable value such that operation of the data communications application is acceptable. This system monitors network links by measuring real time UDP traffic on the links. UDP traffic is a common traffic type used to pass data between applications. Therefore this system can probe the real behavior of network links and provide accurate endpoint network measurement information.

Other embodiments of the invention include computerized devices, such computer systems, workstations or other devices configured or operable to process and perform all of the method operations disclosed herein as embodiments of the invention. In such embodiments, a computer system includes a memory system, a processor, a communications interface and optionally a display and an interconnection mechanism connecting these components. The memory system is encoded with an initiator or target agent software application that when performed on the processor, produces an initiator or target agent process that operates as explained herein to perform all of the method embodiments and operations explained herein as embodiments of the invention.

Other arrangements of embodiments of the invention that are disclosed herein include software programs to perform the method embodiment steps and operations summarized above and disclosed in detail below. More particularly, a computer program product is disclosed that has a computer-readable medium including agent computer program logic encoded thereon that when performed in a computerized device provides operations of the initiator and target applications and processes as respectively explained herein. The computer program logic, when executed on at least one processor with a computing system, causes the processor to perform the operations (e.g., the methods) indicated herein as embodiments of the invention. In addition, the measurement and response packets explained herein when encoded on a computer readable medium or when transmitted as propagated signals represent embodiments of the invention as well. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. Such embodiments may be propogated signals in a carrier medium as well. The software (source code and/or object code) or firmware or other such configurations can be installed onto a computerized device to cause one or more processors in the computerized device to perform the techniques explained herein as embodiments of the invention. Initiator and target agent software processes that operate in a collection of computerized devices, such as in a group of storage area network management servers, hosts or other entities can also provide the system of the invention. The system of the invention can be distributed between many software processes on several computers, or processes such as the report generator process can execute on a dedicated computer alone and the initiator and target agent processes can be remotely operated. The initiator and target agents may be integrated into a storage area network management application as well.

It is to be understood that the system of the invention can be embodied strictly as a software program, as software and hardware, or as hardware alone. Example embodiments of the invention may be implemented within EMC's Control Center and Symmetric Remote Data Facility (SRDF) software application(s) that provide management and data mirroring functionality for storage area network resources and in computerized devices that operate the Control Center software. ControlCenter and SRDF are trademarks of products manufactured by EMC Corporation of Hopkinton, Mass., USA.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION

Figure 1:
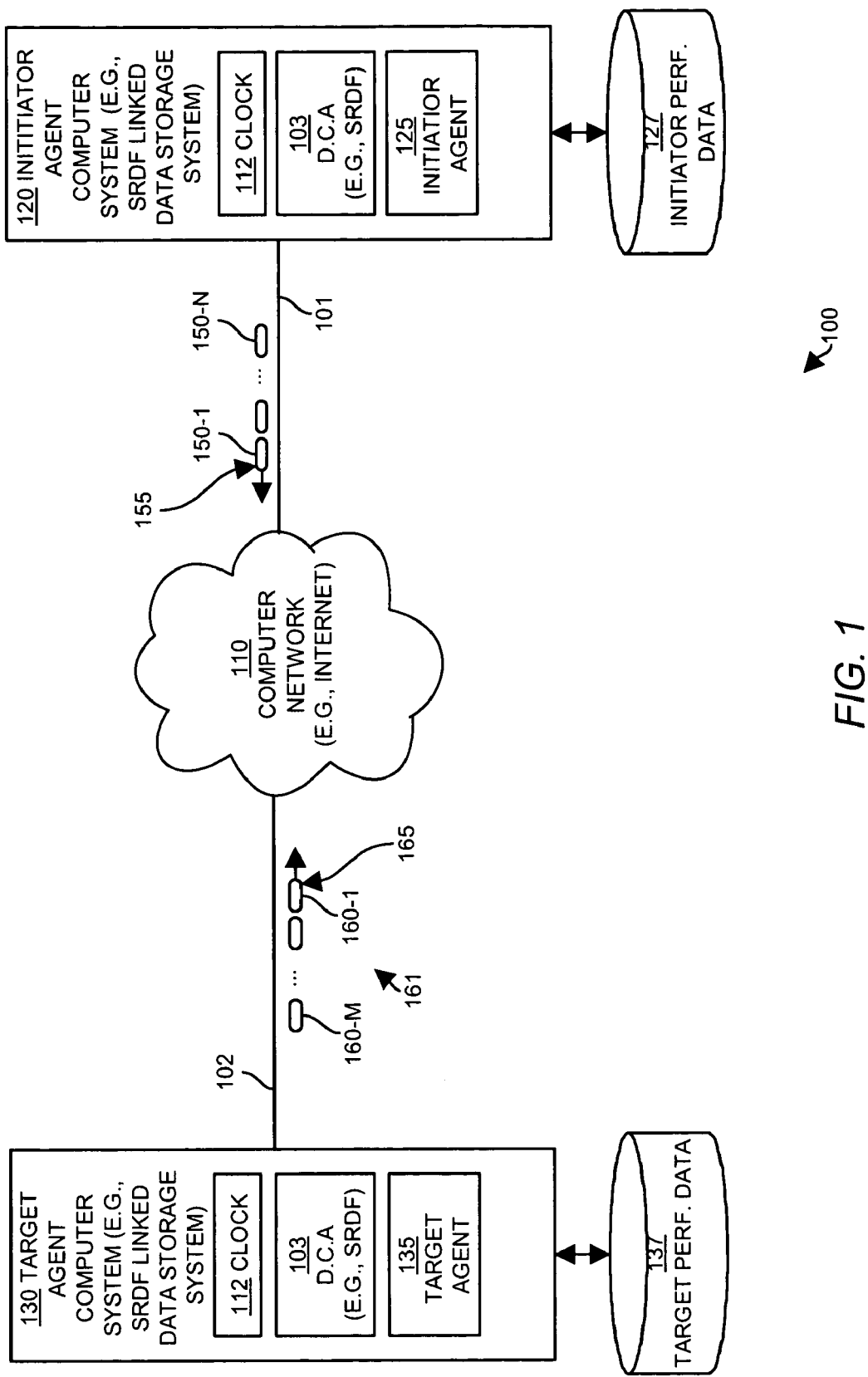
FIG. 1 illustrates an example of computer system environment that operates an initiator agent and target agent application according to embodiments of the invention.

FIG. 1 illustrates an example computing system environment 100 suitable for use in explaining example operations of embodiments of the invention. The example computing system environment 100 includes a computer network 110 that interconnects an initiator agent computer system 120 with a target agent computer system 130. The initiator agent computer system 120 operates (e.g., executes, runs, interprets or otherwise performs) an initiator agent 125 and the target agent computer system 130 operates a target agent 135. The initiator agent 125 and target agent 135 may be, for example, software applications or processes that execute on the initiator and target computer systems 120 and 130 and are capable of communicating with each other as explained herein. The initiator agent computer system 120 and target agent computer system 130 further include synchronized measurement clocks 112. Furthermore, each computer system 120 and 130 operates a data communications application 103 as will be explained.

Generally, embodiments of the invention includes the initiator agent 125 and target agent 135 (and associated computer device hardware to apparatus embodiments) that collectively operate to exchange groups of messages 151 and 161 that enable the agents 125 and 135 to monitor and calculate performance metrics that indicate the performance, availability and stability of network links 101 and 102 within the computer network 110 between the initiator and target computer systems 120 and 130. The computer network 110 may be any type of data communications network such as, for example, the Internet or a private local or wide area network (LAN or WAN). The initiator and target computer systems 120 and 130 may be any type of computerized device for capable of performing data communications over the computer network 110.

As an example, the initiator and target computer systems 120 and 130 may operate as data storage computer systems that each executes a data communications application (DCA) 103. The data communications applications 103 may provide functionality, for example, that allows each computer system 120 and 130 to maintain a mirror, redundant or replica copy of data on behalf of each other. An example of the data communications application 103 for this purpose is the Symmetrix Remote Data Facility (SRDF) software application manufactured by EMC Corp. of Hopkinton, Mass. SRDF operates to allow to data storage computer systems 120 and 130 (i.e., including high-capacity Symmetrix data storage systems manufactured by EMC) to maintain duplicate copies of data with respect to one another over the computer network 110. In this example, the data communications application 103 requires that data communications performance of the communications links 101 and 102 between the initiator and target computer systems 120 and 130 through the computer network 110 meet or exceed a certain level of performance in order for proper operation of the data communications application 103 (e.g., to allow SRDF to properly operate).

Generally, according to operation of embodiments of the invention, the initiator agent 125 creates a series of measurement packets 150-1 through 150-N and transmits these measurement packets 150 onto the computer network 110 for receipt by the target agent 135. In one embodiment, measurement parameter information 155 in each measurement packet includes a respective measurement packet identity such as a sequence number relative to the other measurement packets in the measurement packet group 151. In addition, each measurement packet includes a group count indicating the total number of packets within the measurement packet group 151 (i.e., total number in sequence). The measurement packets 150 also contain one or more measurement performance metrics such as an initiator timestamp indicating when the initiator agent 125 created and transmitted that measurement packet 150 to the target agent 135.

The initiator agent 125 and target agent 135 maintain synchronization of measurement time clocks 112 with each other. As such, the target agent 135 receives the measurement packets 150 and computes a measurement packet one-way travel time based on the initiator timestamp in the measurement packet 150 that indicates travel time for the measurement packet 150 between the initiator agent 125 and the target agent 135. In addition, when all measurement packets 150 of the measurement packet group 151 have been received, the target agent 135 computes an average one-way travel time of all measurement packets 150 received within the measurement packet group 151 as will be explained in more detail.

In addition to calculating one-way travel time of each measurement packet 150, the target agent 135 generates a corresponding response packet 160 for transmission back to the initiator agent 125. The target agent 135 can transmit response packets 160 as parts of a response packet group 161. Each response packet 160 contains response parameter information 165 and includes a copy of the information within its corresponding measurement packet 150 and contains a target processing timestamp generated a target agent 135. In alternative embodiments of the invention, the response packets 160 also contain calculations such as the one-way travel time of the corresponding measurement packet 150 for the initiator agent 125 to the target agent 135. In a further alternative embodiment, the last response packet 160-M can contain the average one-way travel time for the set of measurement packets 150 received within the measurement packet group 151.

When the response packets 160 are individually received at the initiator agent 125, the initiator agent 125 performs calculations such as the one-way travel time for each response packet 160 using the target processing timestamp within the response packet. The target agent 125 also calculates the average one-way travel time from target agent 135 to initiator agent 125 for all packets 160 within the response packet group 161. In addition, the initiator agent 125 computes a round-trip travel time for a measurement packet 150 to be received by the target agent 135 thus causing the target agent 135 to produce and transmit the corresponding response packet 160. The initiator agent 125 further computes an average round-trip travel time of the collective set of measurement packets 150 and corresponding response packets 160.

In addition, embodiments of the invention can compute packet loss metrics. By including sequence numbers and group count information (i.e., the value of N) within the packets 150 and 160 exchanged between the initiator and target agents 125 and 135, packets that may get lost within the computer network 110, such as those discarded or otherwise destroyed by data communications devices can be detected. This allows the initiator and target agent 125 and 135 to compute packet loss rates as a percentage of total packets transmitted using sequence number and group count information as will be explained in more detail. Note that in most cases, where no packet loss is experienced, N will be equal to M and there will be a response packet 160 generated for each measurement packet 150.

In addition, the packets 150 and 160 exchanged between the initiator and target agent 125 and 130 contain payload data that defines an associated packet size. By adding payload data to the measurement and response packets 150 and 160 of this invention, such packets more closely approximate actual network traffic within the computer network 110 and thus network behavior that may affect packet latency or packet loss will be applied to the measurement and response packets 150 and 160 as it would be to any normal application data traffic.

Using these and other computations, embodiments of the invention provide the ability to accurately detect network performance metrics such as individual and average packet latencies and packet losses for groups of packet exchange between the initiator and target agent computer systems 120 and 130. By periodically performing operation of embodiments of the invention (e.g., once every second with a sequence of ten measurement and response packets), network links 101 and 102 can be monitored to determine when network performance is within an acceptable value such that operation of the data communications application 103 is acceptable. Further details of specific embodiments of the invention will now be explained with respect to the flowcharts of processing steps in FIG. 2 that shows processing operations of the initiator agent 125 and target agent 135. Specific details of each of processing operations shown in the flowcharting FIG. 2 will be explained in subsequent flowcharts.

Figure 2:
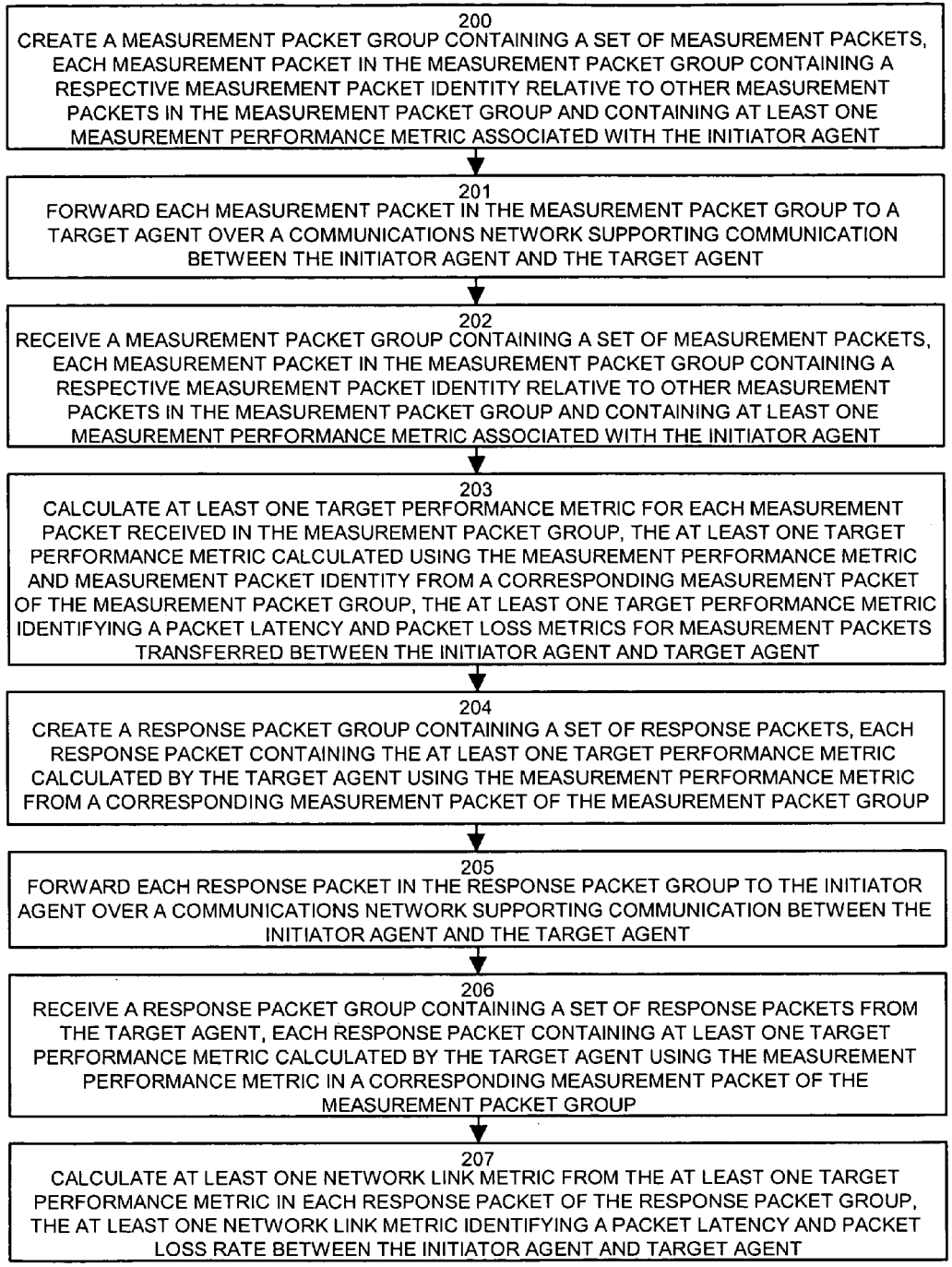
FIG. 2 is a flow chart of processing steps performed by an initiator agent and target agent in accordance with embodiments of the invention.

FIG. 2 is a flow chart of processing steps that show processing details of an initiator agent 125 and target agent 135, each configured in accordance with embodiments of the invention, operating in conjunction with each other to determine performance of a network links (i.e., the network 110) between the initiator agent 125 and a target agent 135. In FIG. 2, the initiator agent 125 performs the processing of steps 200, 201, 206 and 207 while the target agent 135 performs the processing operations of steps 202 through 205.

In step 200, the initiator agent 125 creates a measurement packet group 151 containing a set of measurement packets 150-1 through 150-N. Each measurement packet 150 in the measurement packet group 151 contains a respective measurement packet identity relative to other measurement packets in the measurement packet group and contains at least one measurement performance metric associated with the initiator agent. As an example, the packet identity can be a sequence number of the packet relative to other packets in the measurement packet group 151 and the measurement performance metric can be a timestamp generated by the initiator agent 125 upon transmission of each measurement packet 150.

An example contents of measurement packets in accordance with one example embodiment of the invention contains the following measurement parameters:

Packet size—a size in bytes of the measurement packet;
Packet verification identity—cryptographic information such as a key allowing the initiator agent and target agent to verify each other's identity using a cryptographic verification process.
Measurement group count—indicates total number of measurement packets in measurement packet group.

Measurement sequence number—indicates measurement packet identity relative to other measurement packets in the measurement packet group.

Measurement transmit timestamp—timestamp when initiator agent transmits measurement packet.

Initiator communications port identity—UDP port number for communications between the initiator and target agent.

Payload data—data inserted into measurement packet to simulate packet sizes of application data (payload data size can vary and will effect packet size).

In preferred embodiments of the invention, clock and timing information used within the initiator agent computer systems 120 to create the measurement transmit timestamp for measurement packets 150 is synchronized with clock and timing information used for calculations and packet generation performed within the target agent computer systems 130. Thus embodiments of the invention maintain clock synchronization between the initiator agent 125 and the target agent 135 for purposes as will be explained.

In step 201, the initiator agent 125 forwards each measurement packet 150 in the measurement packet group 151 to a target agent 135 over a communications network 110 supporting communication between the initiator agent 125 and the target agent 135. In this example, a single initiator agent 125 and target agent 135 are communicating over a computer network 110 such as the Internet. It is to be understood that this is shown by way of example only and that there may be an initiator agent 125 that communicates in the manner explained herein with multiple target agents 135. Furthermore, it is to be understood that the computer network 110 does not have to be the Internet and could be, for example, a local or wide area network or any other type of public or private network or communications medium.

Using the aforementioned processing steps 200 and 201, the initiator agent 125 repeats creation of each measurement packet 150 and forwards each measurement packet such that measurement packets 150-1 through 150-N in the measurement packet group are forwarded to the target agent 135 in a sequence. As an example of steps 200 and 201, the initiator agent 125 may create and transmit ten (N=10) measurement packets in sequence for reception by the target agent 135. The measurement packets may be User Datagram Protocol (UDP) packets. Further details of creation and forwarding of measurement packets in accordance with embodiments of the invention will be explained shortly with respect to processing steps shown in FIG. 3. After transmission of the measurement packets 150 onto the computer network 110, the target agent 135 forms of processing steps 202 through 205 in FIG. 2 to receive in process the measurement packets and for creation of response packets 160.

In step 202, the target agent 135 receives the measurement packet group 151 containing the set of measurement packets 150 as a series of measurement packets 150-1 through 150-N (i.e., receives the individual measurement packets 150 as they arrive over the network 110). As noted above, each measurement packet 150 in the measurement packet group 151 contains a respective measurement packet identity such as a measurement sequence number relative to other measurement packets in the measurement packet group and contains at least one measurement performance metric such as a measurement transmit timestamp associated with the initiator agent 125.

In step 203, the target agent 135 calculates at least one target performance metric (stored within the target performance database 137) for each measurement packet 150 received in the measurement packet group 151. The target agent 135 calculates the target performance metric(s) 137 using the measurement performance metric (e.g., initiator measurement transmit timestamp) and measurement packet identity (e.g., measurement sequence number and measurement group count) (generally shown as measurement parameter information 155 in FIG. 1) from a corresponding measurement packet 150 of the measurement packet group 151. The target performance metrics 137 that the target agent 135 calculates indicate or identify a packet latency and packet loss metric for measurement packets transferred between the initiator agent 125 and the target agent 135.

As an example, the target agent 135 can compute, for each measurement packet 150, a packet one-way travel time equal to the difference between the measurement transmit timestamp and a target processing timestamp generated by the target agent 135 upon receipt of the measurement packet 150. In addition, when all packets have been received in particular measurement packet group 151, the target agent 135 can compute an average one-way travel time for each measurement packet by dividing a summation of the individual one-way packet travel times by a packet count of all measurement packets received. Further still, the target agent 135 can compute a packet loss metric using the packet count of all measurement packets received in conjunction with the measurement group count indicating how many measurement packets were transmitted within the measurement packet group 151. The packet loss metric can be a ratio of packets received to packet loss or can be a percentage received rate or percentage loss rate.

In step 204, target agent 135 creates a response packet group 161 containing a set of response packets 160-1 through 160-M. In preferred embodiments of the invention, the target agent 135 creates a response packet 160 for each measurement packet 150 received in step 202. Each response packet 160 contains at least one target performance metric (e.g., the one-way packet latency of the corresponding measurement packet 150 from the initiator agent 125) calculated by the target agent 125 using the measurement performance metric (e.g., the initiator timestamp) from a corresponding measurement packet 150 of the measurement packet group 151. In other words, when the target agent 135 receives each measurement packet 150, the target agent can perform calculations based upon information within the measurement packets 150 such as the initiator timestamp in order to determine performance metrics such as one-way packet latency of the measurement packet 150 traveling between initiator and target computer systems 120 and 130. Upon calculating such performance metric information, the target agent 135 can insert such information within a corresponding response packet 160 to be transmitted to the initiator agent 125. In addition, the target agent 135 can store such calculated performance metrics within the target performance database 137 for reporting purposes.

In an alternative embodiment of the invention, target agent calculations performed to determine network performance metrics by the target agent 135 are only for use by the target agent and creation of a response packet 160 from a corresponding measurement packet 150 simply includes copying the measurement packet 150 into a corresponding response packet header 160 addressed back to the target agent 125 and inserting the target processing timestamp into the return response packet 160. In such embodiments, the initiator agent 125, upon receipt of the response packets 160, can perform the calculations of one-way travel time of the measurement packets 150 from the initiator agent 125 to the target agent 135 using the target processing timestamp inserted by the target agent 135 into the response packets 160. Accordingly, in one embodiment of the invention of the parameter information 165 in each response packet 160 includes a copy of all parameter information 155 from the corresponding measurement packet 150 in addition to the target processing timestamp. In the alternative arrangement explained above, the parameter information 165 can further include the one-way travel time calculated by the target agent 135 for particular measurement packet 150.

In step 205, the target agent 135 forwards each response packet 160 in the response packet group 161 to the initiator agent 125 over the communications network 110 supporting communication between the initiator agent 125 and the target agent 135. In preferred embodiments of the invention, each response packet 160 is immediately created and forwarded in response to receipt of the corresponding measurement packet 150 such that there is minimal or insignificant delay incurred within the target agent computer systems 130 to perform measurement packet processing and creation of a corresponding response packet 160.

In preferred embodiments of the invention, each response packet 160 contains a copy of parameter information 155 contained within a corresponding measurement packet 150. As an example, the parameters contained within a specific measurement packet 150 can indicate such information as the sequence number of that measurement packet, the group count identifying how many measurement packets are contained within the measurement packet group 150, an initiator timestamp created by the initiator agent 125 and possibly other measurement parameters such as those indicated in the list above. Creation of a response packet 160 in this embodiment includes copying such parameters 155 for the measurement packet 150 to the corresponding response packet 160 as response packet parameters 165. In this manner, when the initiator agent 125 receives a response packet 160, the initiator agent 125 will be able to coordinate and determine which particular measurement packet 150 resulted in the creation of a received response packet 160. Furthermore, by copying the parameters 155 for measurement packets 150 to the response packet 160, the target agent 135 makes it possible for the initiator agent 125 to generate performance metrics concerning the overall round-trip travel time for the initiator agent 125 to the target agent 135 and back for a corresponding pair of measurement and response packets 150 and 160, as well as the one-way travel time when measurement packet 150 (by using the target processing timestamp inserted by the target agent 135).

Next, in step 206, the initiator agent 125 receives a response packet group 161 containing a set of response packets 160-1 through 160-M from the target agent 135. Each response packet 160 contains at least one target performance metric (e.g., the target processing timestamp generated by the target agent 135 during receipt of the measurement packet and creation of the corresponding response packet, and possibly calculations such as the one-way travel time of the corresponding measurement packet 150) calculated by the target agent 135 using the measurement performance metric (e.g., measurement transmit timestamp and/or sequence number and group count) in a corresponding measurement packet 150 of the measurement packet group 151.

In step 207, the initiator agent 125 calculates at least one network link metric 128 from the target performance metric(s) and parameter information 165 in each response packet 160 of the response packet group 161. The network link metric(s) 128 identify a packet latency and packet loss rate between the initiator agent 125 and target agent 135 for the within the measurement and response packet groups 151 and 161. In this manner, embodiments of the invention operate to provide a system for determining network link metrics such as packet loss ratios and packet latency and a highly accurate manner.

As an example, the initiator agent 125 can compute, for each response packet 160, the one-way travel time as a difference between the arriving time of that response packet and the target processing timestamp contained within the response packet. If the block synchronization mechanism between the initiator and target agent includes a time delta value, the time delta value can be included in his calculations well. Furthermore, the initiator agent can compute an average one-way travel time for the response packets 160 using a summation of the one-way travel times for each response packet 160 divided by the number of response packets received. The initiator agent 125 can further calculate a packet round-trip travel time using a difference between the arrival time of a response packet 160 and the measurement initiator timestamp of the corresponding measurement packet contained as parameter information 165 within that response packet 160. An average round-trip travel time for all measurement and response packets can be computed as well in a manner similar to the average one-way travel time. Still further, the initiator agent 125 can calculate a round-trip packet loss rate by dividing the received response packet count by the measurement group count. Packet loss rate can be computed as one minus the round-trip packet loss rate. Further details of such processing and calculations without explained with respect to the remaining flowcharts of processing steps.

Figure 3:
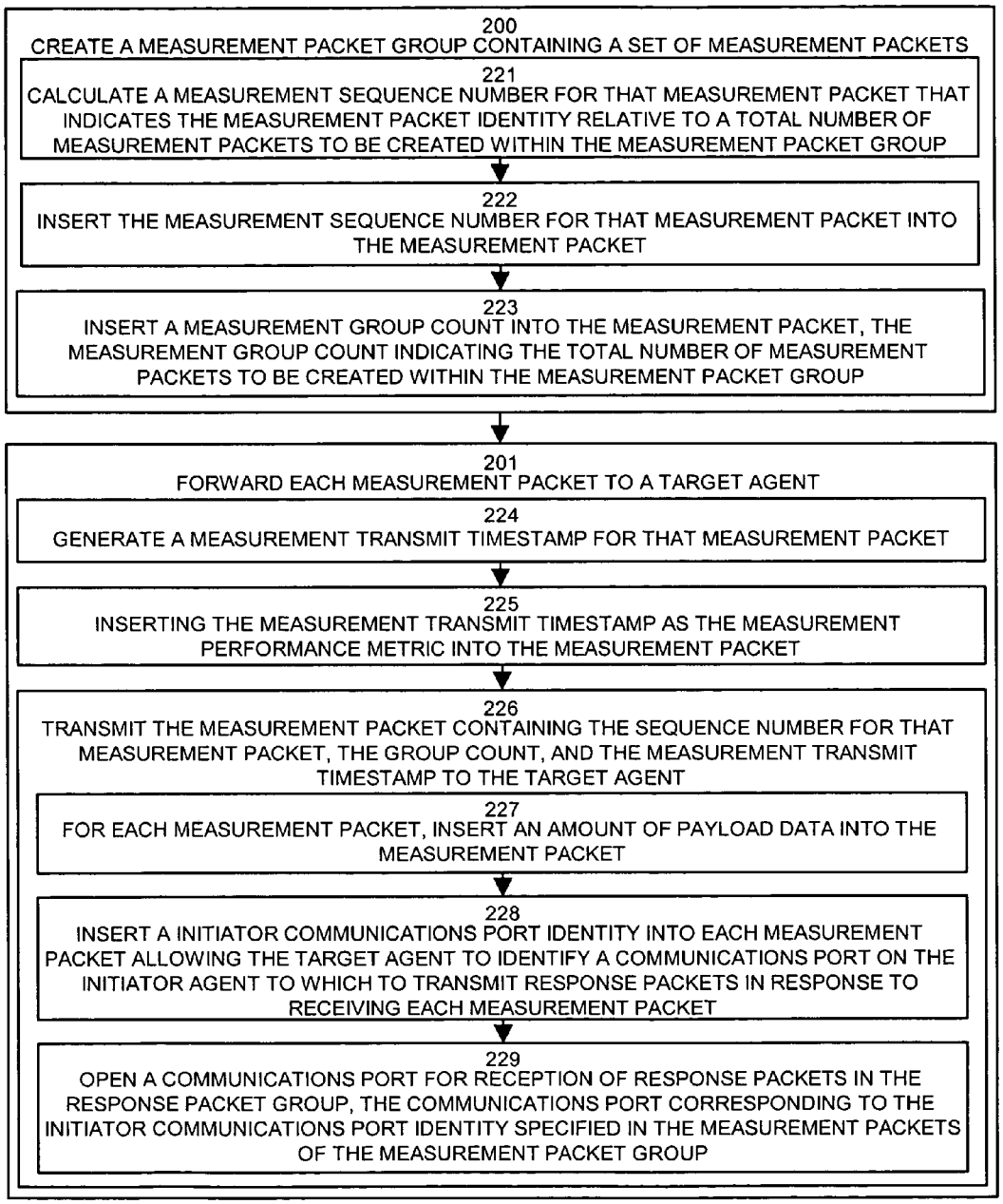
FIG. 3 is a flow chart of detailed processing steps performed by an initiator agent to produce and forward measurement packets to a target agent in accordance with embodiments of invention.

FIG. 3 is a flow chart that shows detailed processing steps for steps 200 and 201 above (from FIG. 2) for creating a measurement packet group 151 containing a set of measurement packets 150-1 through 150-N and forwording each measurement packet in the measurement packet group to a target agent 135 in accordance with one example embodiment of the invention. The processing steps 221 through 229 are performed for each measurement packet 150 in the measurement packet group 151.

In step 221, the initiator agent 125 calculates a measurement sequence number (e.g., 1, 2, 3 . . . N) for that measurement packet that indicates the measurement packet identity relative to a total number (N) of measurement packets to be created within the measurement packet group;

In step 222, the initiator agent 125 inserts the measurement sequence number for that measurement packet into the measurement packet 150.

In step 223, the initiator agent 125 inserting a measurement group count (i.e., N) into the measurement packet 150. The measurement group count indicates the total number of measurement packets 150 to be created within the measurement packet group 151. The measurement sequence number and measurement group count allow the target agent 135 in one embodiment to compute a packet loss metric of measurement packets within the measurement packet group.

Next, to forward each measurement packet in the measurement packet group to the target agent 135, the initiator agent 125 performs steps 224 through 229 for each measurement packet 150.

In step 224, the initiator agent 125 generates a measurement transmit timestamp for that measurement packet.

In step 225, the initiator agent 125 inserts the measurement transmit timestamp as the measurement performance metric into the measurement packet 150. The measurement transmit timestamp allows the target agent to compute a measurement packet one way travel time between the initiator agent 125 and the target agent 135 upon receipt of that measurement packet 150 by the target agent 135. The initiator agent 125 can obtain the value for the measurement transmit timestamp from the measurement clock 112 that is synchronized with a measurement clock 112 in the target agent computer system 120.

In step 226, the initiator agent 125 transmits the measurement packet 150 containing the sequence number for that measurement packet, the group count, and the measurement transmit timestamp to the target agent 135. Steps 227 through 229 show processing details that the initiator agent 125 performs to transmit measurement packets 150.

In step 227, the initiator agent 125 inserts an amount of payload data into the measurement packet. The specific amount of halo data inserted into the measurement packet 150 can be adjusted. Preferred amounts of payload data are sized to approximate packet sizes of application data packet exchange between the data communications application 103.

In step 228, the initiator agent 125 inserts an initiator communications port identity into each measurement packet 150 allowing the target agent 135 to identify a communications port (e.g., UDP port) on the initiator agent 125 to which to transmit response packets 160 in response to receiving each measurement packet 150. Each target agent 135 listens to its target measurement port for incoming measurement packets 150. By specifying an initiator communications port within the measurement packet 150, the initiator agent 125 can open and close the port for receipt of response packets as needed in order to prevent unauthorized communications on the port number during times of which no response packets 160 are expected. Furthermore, by being able to specify an initiator communications port identity within the measurement packets 150 sent to a specific target agent 135, the initiator agent 125 can perform the processing of the invention with a plurality of target agents 135 in different target agent computer systems and each set of response packets can be received any different communications port at the initiator agent computer system 120.

In step 229, the initiator agent 125 opens the communications port for reception of response packets 160-1 through 160-M in the response packet group 161. The communications port that is opened corresponds to the initiator communications port identity specified in the measurement packets 150 of the measurement packet group 151. Once opened, the initiator agent can perform step 201 to forward the measurement packets 150 to the target agent 135.

Figure 4:
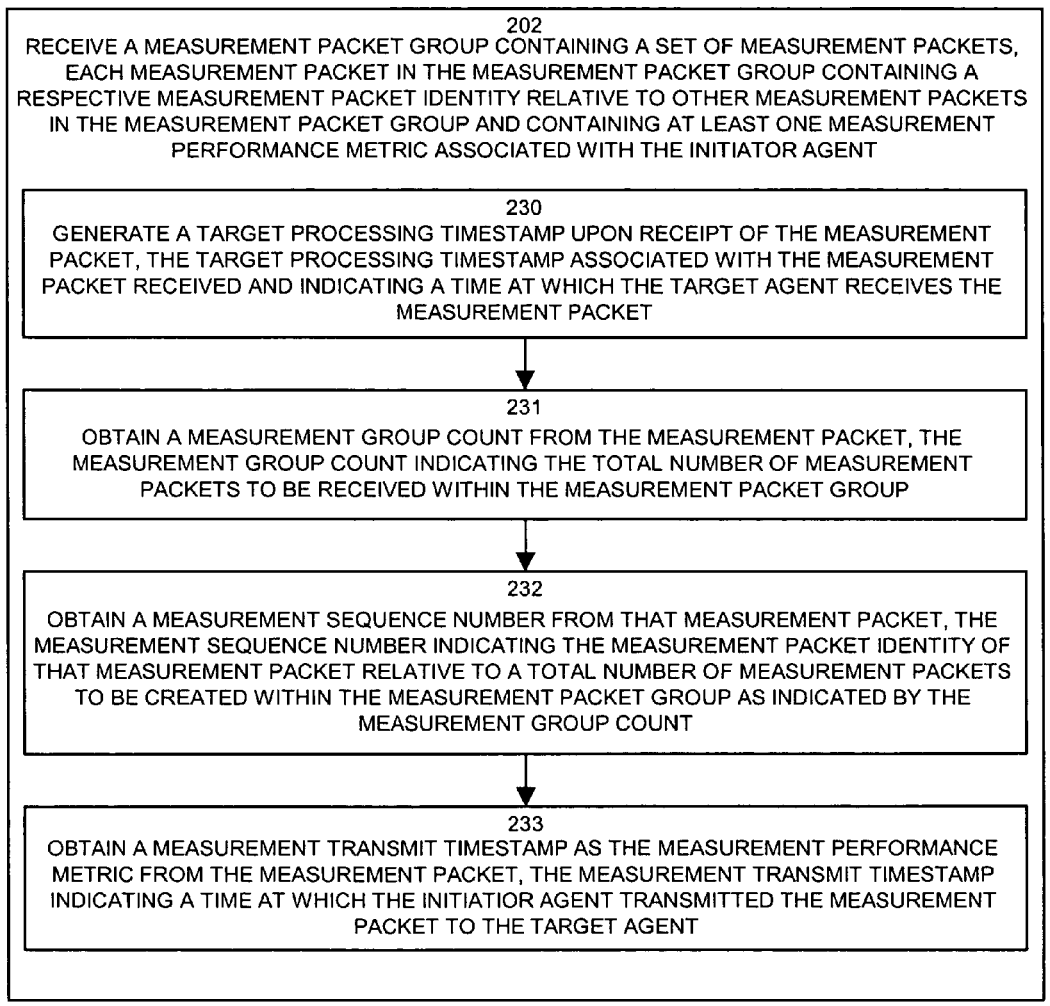
FIG. 4 is a flow chart of detailed processing steps performed by the target agent to receive measurement packets in accordance with embodiments of invention.

FIG. 4 is a flow chart of processing steps that shows details of processing operations that the target agent 135 performs in step 202 (FIG. 2) to receive a measurement packet group 151 containing a set of measurement packets 150. The processing steps 230 through 233 are performed for each measurement packet 150 in the measurement packet group 151.

In step 230, the target agent 135 generates a target processing timestamp upon receipt of the measurement packet 150. The target processing timestamp is associated with the measurement packet 150 received and indicates a time at which the target agent 135 receives the measurement packet 150. The target agent 135 can obtain the target processing timestamp from the clock 112 synchronized with the initiator agent computer system 120.

In step 231, the target agent 135 obtains a measurement group count from the measurement packet. The measurement group count indicates the total number (N) of measurement packets 150 to be received within the measurement packet group 151.

In step 232, the target agent 135 obtains a measurement sequence number from that measurement packet 150. The measurement sequence number indicates the measurement packet identity or order of that measurement packet 150 relative to the total number of measurement packets to be created within the measurement packet group 151, as indicated by the measurement group count (N).

In step 233, the target agent 135 obtains a measurement transmit timestamp as the measurement performance metric from the measurement packet 150. The measurement transmit timestamp indicates a time at which the initiator agent 125 transmitted the measurement packet 150 to the target agent 135.

Figure 5:
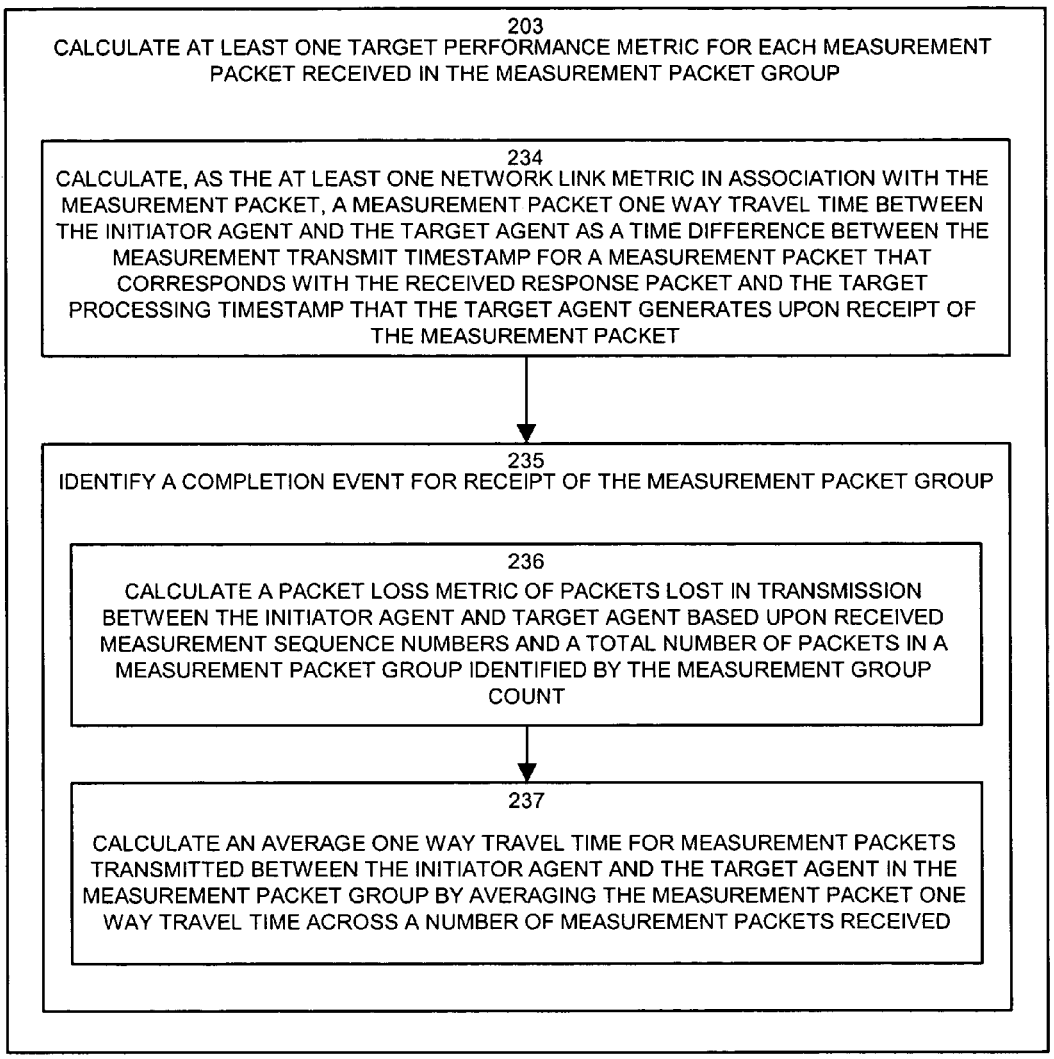
FIG. 5 is a flow chart of detailed processing steps performed by the target agent to calculate target performance metrics in accordance with embodiments of invention.

FIG. 5 is a flow chart of processing steps that shows details of processing operations that the target agent 135 performs in step 202 (FIG. 2) to calculate at least one target performance metric for each measurement packet 150 received in the measurement packet group 151.

In step 234, the target agent 135 calculates, as the network link metric in association with the measurement packet, a measurement packet 150 one way travel time between the initiator agent 125 and the target agent 135 as a time difference between the measurement transmit timestamp for a measurement packet that corresponds with the received response packet and the target processing timestamp that the target agent 135 generates upon receipt of the measurement packet from the click 112. The measurement packet one way travel time indicates network propagation time of the measurement packet 150 from the initiator agent computer system 120 to the target agent computer system 130. Processing step 234 is optional and is not required by embodiment of the invention but is shown here for completeness.

In step 235, the target agent 135 identifies a completion event for receipt of the measurement packet group 151, and in response to identifying the completion event, performs the processing steps 236 and 237. The completion of and other measurement packet group 151 can include, for example, receiving all measurement packets 150-12 150-N within the measurement packet group 151 containing N measurement packets 150 as specified by the measurement packet group count parameter within each measurement packet 150. Alternatively, if some measurement packets 150 are lost within the computer network 110, a completion event may be a timeout that occurs while awaiting receipt of one or more measurement packets 150. When completion event for the measurement packet group is detected, processing proceeds to perform calculations in step 236 and 237.

In step 236, the target agent 135 calculates a packet loss metric of measurement packets 150 lost in transmission between the initiator agent 125 and target agent 135 based upon received measurement sequence numbers and a total number of packets in a measurement packet group identified by the measurement group count.

In step 237, the target agent 135 calculates an average one way travel time for measurement packets 150 transmitted between the initiator agent 125 and the target agent 135 in the measurement packet group 151 by averaging the measurement packet one way travel time across a number of measurement packets received. Processing steps 236 and 237 our optional and embodiment of the invention and are used for reporting purposes within the target agent 135. In alternative embodiment of the invention, the target agent 135 does not need to perform such calculations and can simply receive a measurement packet 150, insert the target processing timestamp, and then forward or redirect that measurement packet 150 as a response packet 160 back to the initiator agent computer system 120 receipt by the initiator agent 125.

Figure 6:
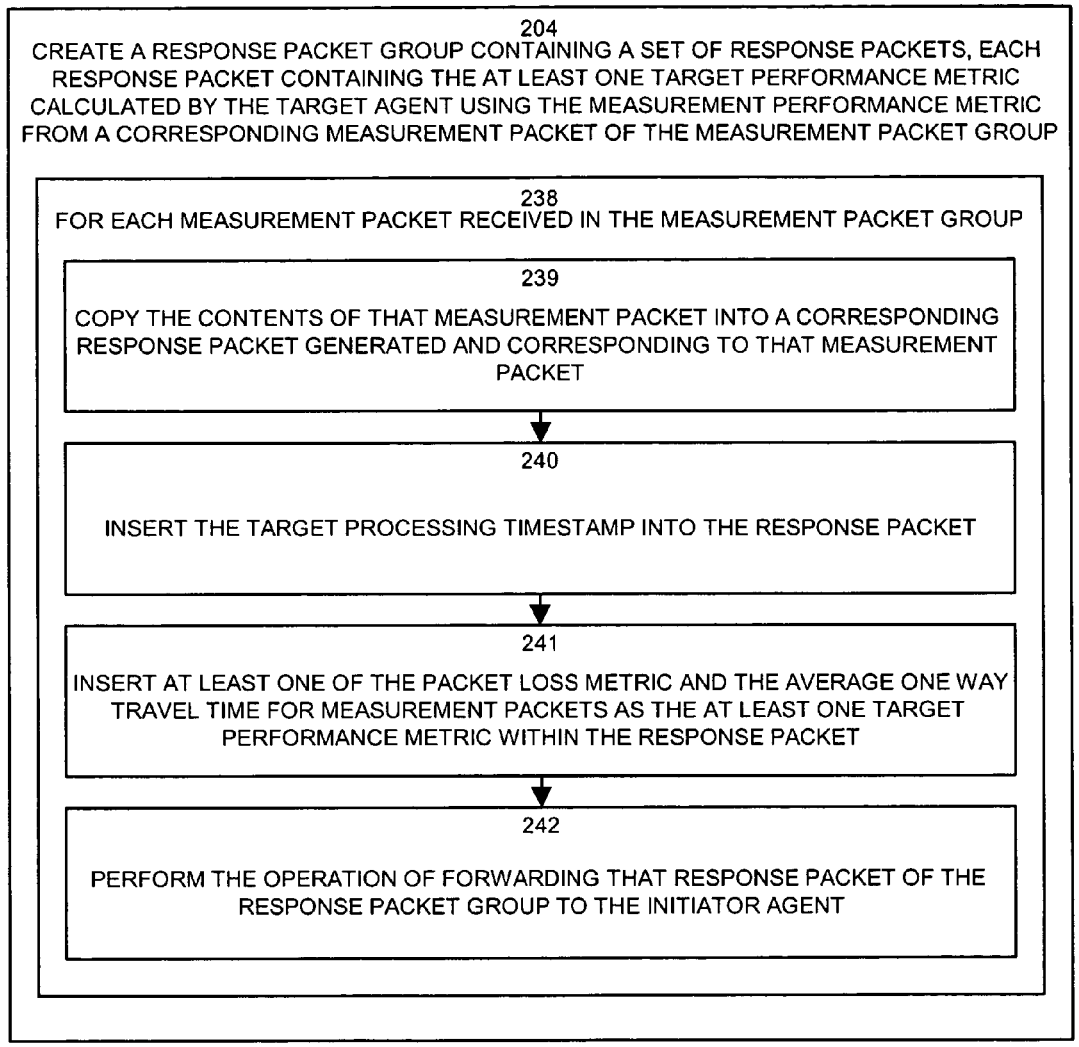
FIG. 6 is a flow chart of detailed processing steps performed by the target agent to create and forward response packets in accordance with embodiments of invention.

FIG. 6 is a flow chart of processing steps that shows details of processing operations that the target agent 135 performs in steps 204 and 205 (FIG. 2) to create and forward response packets 160 of a response packet group 161 to the initiator agent 125. The processing steps 238 through 241 are performed for each measurement packet 150 received in the measurement packet group 151.

In step 238, the target agent 135 copies the contents of that measurement packet 150 into a corresponding response packet 160 that the target agent 135 generates and that corresponds with that measurement packet 150.

In step 239, the target agent 135 inserts the target processing timestamp 165 into the response packet.

In step 240, the target agent 135 inserts at least one of the packet loss metric and the average one way travel time for measurement packets as the at least one target performance metric within the response packet 150. As noted above, this step may be optional. In such cases, the target performance metric is simply the target processing timestamp generated and inserted into the response packet 160 just prior to transmission back to the initiator agent 125.

Then, in step 241, the target agent 135 performs the operation of forwarding that response packet 160 of the response packet group 161 to the initiator agent 125.

Figure 7:
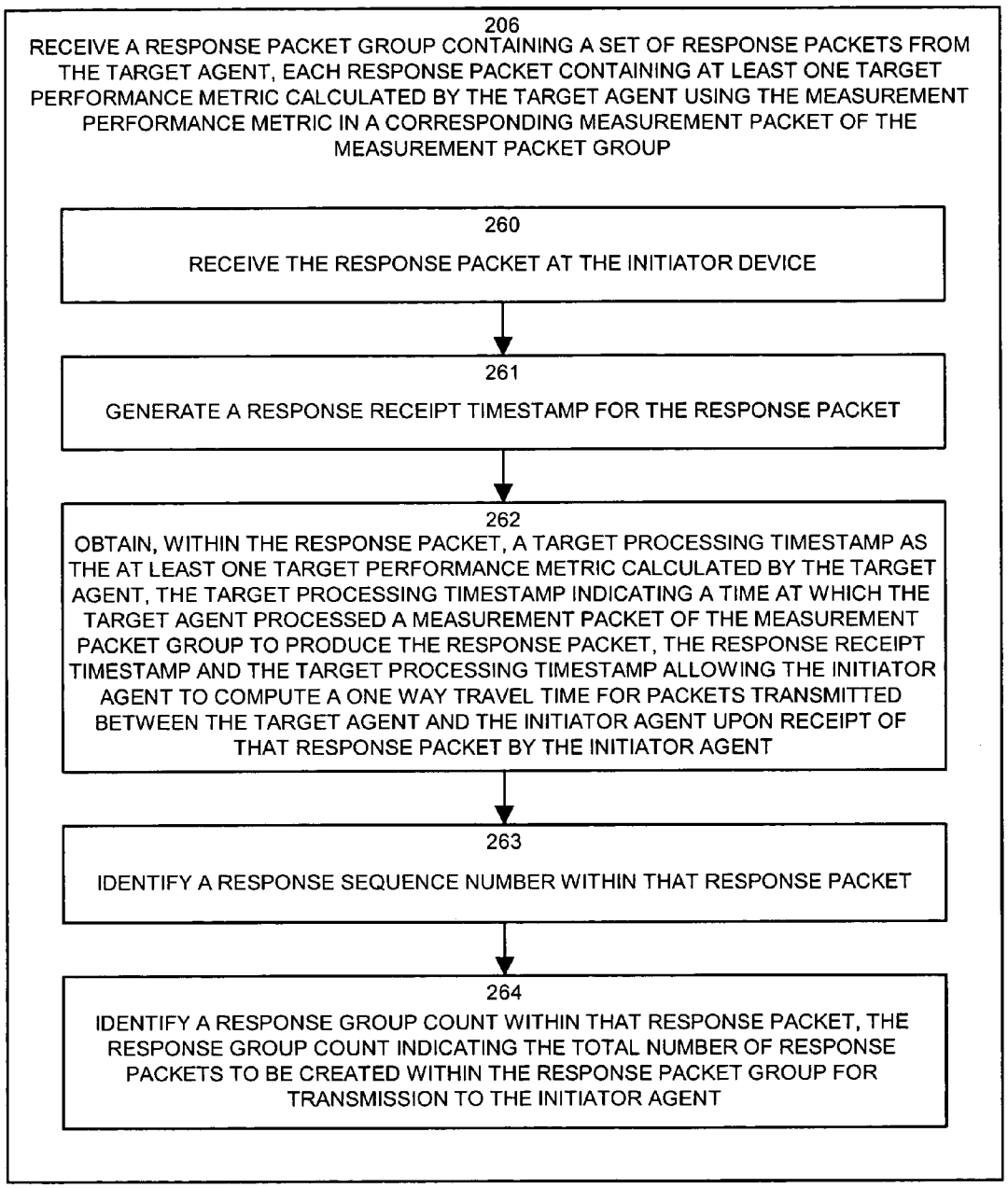
FIG. 7 is a flow chart of detailed processing steps performed by the initiator agent to receive response packets in accordance with embodiments of invention.

FIG. 7 shows processing operations performed by the initiator agent 125 to receive each response packet 160 in the response packet group 161 (i.e., details of step 206 in FIG. 2). The initiator agent 125 performs the processing steps 260 through 265 for each response packet 160-1 through 160-M. Note that in most cases, where no packet loss is experienced, N will be equal to M.

In step 260, the initiator agent 125 receives a response packet 160 at the initiator device such as the initiator computer system 120.

In step 261, the initiator agent 125 generates a response receipt timestamp for the response packet 160.

In step 262, the initiator agent 125 obtains, within the response packet 160, a target processing timestamp (one of the parameters 165 in the response packet 160) as the target performance metric calculated by the target agent 135. The target processing timestamp indicates a time at which the target agent 135 processed a corresponding measurement packet 150 of the measurement packet group 151 to produce the response packet 160. The response receipt timestamp and the target processing timestamp allow the initiator agent to compute a one way travel time for packets transmitted between the target agent and the initiator agent upon receipt of that response packet by the initiator agent 125.

In step 263, the initiator agent 125 identifies a response sequence number within that response packet. This is the M value of that response packet.

In step 264, the initiator agent 125 identifies a response group count within that response packet 160. The response group count indicates the total number M of response packets to be created within the response packet group for transmission to the initiator agent. In preferred embodiments, M is equal to N. If packet loss is experienced however, M may be less than N that indicates loss of either a measurement packet 150 or a response packet 160.

Figure 8:
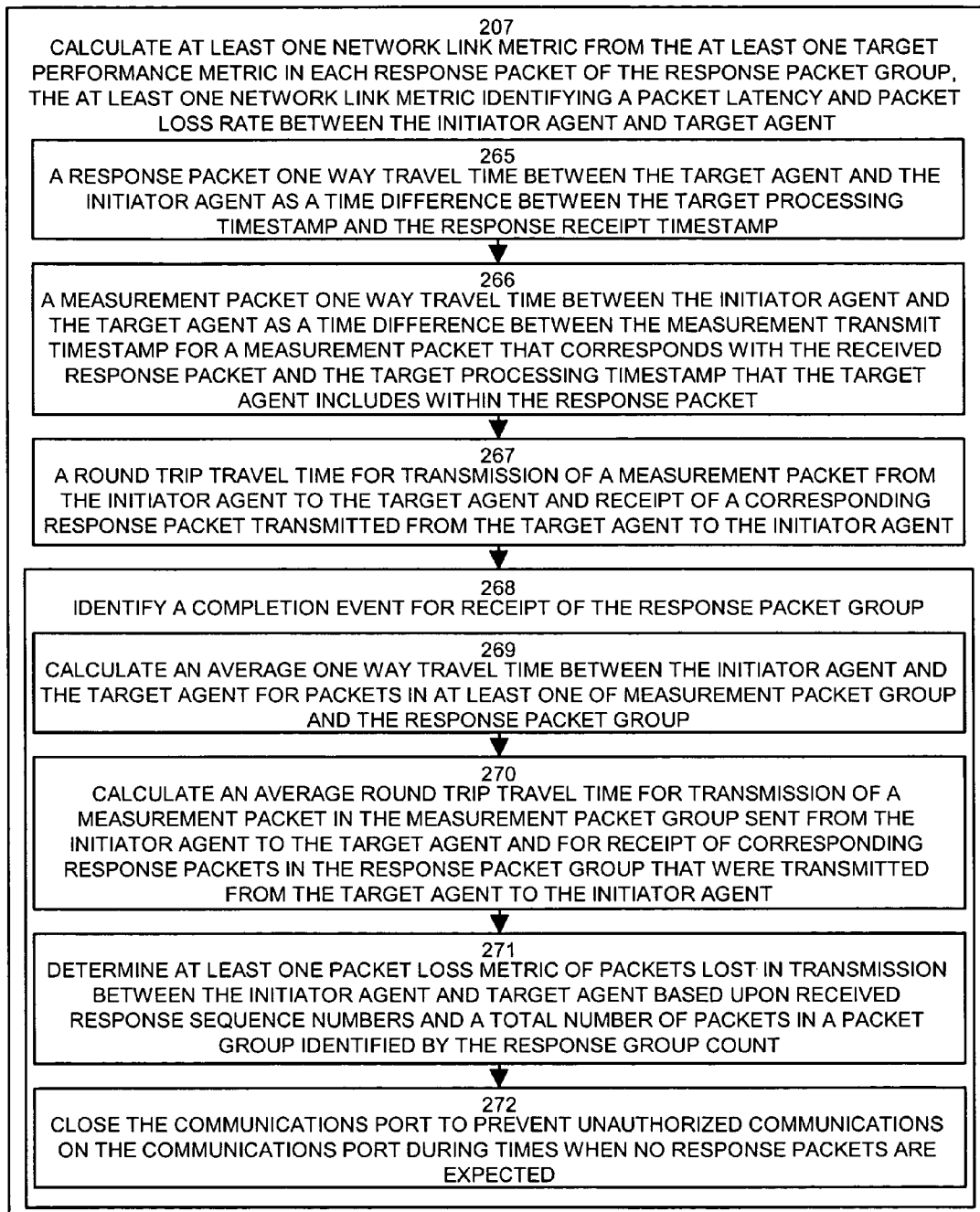
FIG. 8 is a flow chart of detailed processing steps performed by the initiator agent to calculate network performance metrics in accordance with embodiments of invention.

FIG. 8 shows processing steps performed by the initiator agent 128 to calculate at least one network link metric (step 207 in FIG. 2) from the target performance metric(s) or parameters 165 in each response packet 160 of the response packet group 161. For each response packet 160 received, the initiator agent 125 calculates one or more of the following network link metrics is shown in steps 265 through 267.

In step 265, the initiator agent 125 calculates a response packet one way travel time between the target agent and the initiator agent as a time difference between the target processing timestamp and the response receipt timestamp.

In step 266, the initiator agent 125 calculates a measurement packet one way travel time between the initiator agent 125 and the target agent 135 as a time difference between the measurement transmit timestamp for a measurement packet that corresponds with (i.e., that is included within) the received response packet 160 and the target processing timestamp that the target agent 135 includes within the response packet 160. The difference in these two timestamps can indicate one-way packet time to travel for measurement packets. A similar calculation can be made for response packet one-way travel time as well using the different between the target processing timestamp and a timestamp of receipt of the response packet 160 at the initiator agent 125.

In step 267, the initiator agents 125 calculates a round trip travel time for transmission of a measurement packet 150 from the initiator agent 125 to the target agent 135 that includes return receipt of a corresponding response packet 160 transmitted from the target agent 135 to the initiator agent 125. The synchronized clocks 112 can be used for this purpose, and if the clock synchronization algorithm includes a delta time difference between each clock 112, this can be factored in as well. In this manner, the initiator agent 125 repeats receiving each response packet and calculating at least one network link metric in a sequence for each response packet of the response packet group, such that a respective network link metric is calculated for each response packet.

In step 268, upon calculating one or more of such statistics for each response packet 160 received at the initiator agent 125, the initiator agent 125 identifies a completion event for receipt of the response packet group 161. The completion event can be receipt of all response packets in the response packet group (specified by a value of M in each response packet) or can be detection of a time-out for one or more response packets 160 that are lost in the network 110. In response to the completion event, the initiator agent 125 performs the processing steps 269 through 272.

In step 269, the initiator agent 125 calculates an average one-way travel time between the initiator agent 125 and the target agent 135 for packets in at least one of measurement packet group 151 and the response packet group 161. This can be for one way times in either direction between the two agents 125 and 135.

In step 270, the initiator agent 125 calculates an average round trip travel time for transmission of measurement packets 150 in the measurement packet group 151 sent from the initiator agent 125 to the target agent 135 and for receipt of corresponding response packets 160 in the response packet group 161 that were transmitted from the target agent 135 to the initiator agent 125.

In step 271, the initiator agent 125 determines at least one packet loss metric of packets lost in transmission between the initiator agent 125 and target agent 135 (in either direction) based upon received response sequence numbers and a total number M of packets in a packet group identified by the response group count M. The packet loss metric(s) includes one or more metrics such as a round trip packet loss metric, a one way packet loss metric of packets transmitted from the initiator agent 125 to the target agent 135 (using sequence numbers of measurement packets received and entered into response packets) and/or a one way packet loss metric of packets transmitted from the target agent 135 to the initiator agent 125.

In step 272, the initiator agent 125 then closes the communications port after all packets are received (in response to the completion event).

In this manner, embodiments of the invention can provide network performance metrics concerning communications between the initiator and target computer systems 120 and 130. Note that in one embodiment of the invention, communications are secure and the measurement packets 150 and the response packets 160 include a packet verification identity including cryptographic information (e.g., cryptographic key) allowing the initiator agent 125 and target agent 135 to verify their identity using a crypto graphic verification process. In addition, the data in all packets can be encrypted and transferred using any number of secure communications protocols.

Embodiments of the invention can be performed at periodic intervals and parameters can be change for different sequences of measurement and response packets.

As an example, in one embodiment, each response packet 160 in the response packet group 161 includes a copy of the payload data (and other parameters 155) obtained from within corresponding measurement packets 150 of the measurement packet group 151. This embodiment repeats creation of each measurement packet, forwarding of each measurement packet of the measurement packet group, receiving a response packet group and calculating at least one network link metric in a sequence of multiple iterations. For each measurement packet group 151 in each iteration in the sequence of iterations (i.e., many series of measurement group transmissions), the initiator agent 125 adjusts the amount of payload data inserted into the measurement packet sequence group to identify how the calculated network link metric(s) change based on the adjusted amount of payload data. In preferred arrangements, the amount of payload data inserted into the measurement packet 160 causes an overall packet size of the measurement packet to substantially reflect application level traffic between the initiator agent and the target agent for the data communications application 103, such as SRDF.

What is claimed is:

1. In an initiator agent, a method for determining performance of a network link between the initiator agent and a target agent, the method comprising:
creating a measurement packet group containing a set of measurement packets, each measurement packet in the measurement packet group containing a respective measurement packet identity relative to other measurement packets in the measurement packet group and containing at least one measurement performance metric associated with the initiator agent, by, for each measurement packet:
calculating a measurement sequence number for that measurement packet that indicates the measurement packet identity relative to a total number of measurement packets to be created within the measurement packet group;
inserting the measurement sequence number for that measurement packet into the measurement packet; and
inserting a measurement group count into the measurement packet, the measurement group count indicating the total number of measurement packets to be created within the measurement packet group, the measurement sequence number and measurement group count allowing the target agent to compute a packet loss metric of measurement packets within the measurement packet group;
forwarding each measurement packet in the measurement packet group to a target agent over a communications network supporting communication between the initiator agent and the target agent;
repeating creation of each measurement packet and forwarding of each measurement packet in a sequence for each measurement packet of the measurement packet group, such that measurement packets in the measurement packet group are forwarded to the target agent in a sequence;
receiving a response packet group containing a set of response packets from the target agent, each response packet containing at least one target performance metric calculated by the target agent using the measurement performance metric in a corresponding measurement packet of the measurement packet group, wherein receiving comprises, for each response packet:
identifying a response sequence number within that response packet; and identifying a response, group count within that response packet, the response, group count indicating the total number of response packets to be created within the response packet, group for transmission to the initiator agent; and
calculating at least one network link metric from the at least one target performance metric in each response packet of the response packet group, the at least one network link metric identifying a packet latency and packet loss rate between the initiator agent and target agent, wherein calculating comprises:
identifying a completion event for receipt of the response packet, group, and in response to identifying the completion event, determining at least one packet loss metric of packets lost in transmission between the initiator agent and target agent based upon received response sequence numbers and a total number of packets in a packet group identified by the response group count;
wherein creating a measurement packet group comprises:
for each measurement packet, inserting an amount of payload data into the measurement packet; and
wherein each response packet in the response packet group includes a copy of the payload data within a corresponding measurement packet of the measurement packet group, and wherein the method comprises:
repeating creation of each measurement packet, forwarding of each measurement packet of the measurement packet group receiving a response packet group and calculating at least one network link metric in a sequence of multiple iterations, and for each measurement packet group in each iteration in the sequence of iterations, adjusting the amount of payload data inserted into the measurement packet sequence group to identify how the calculated at least one network link metric changes based on the adjusted amount of payload data, at least one of the amounts of payload data inserted into the measurement packet causing an overall size of the measurement packet to substantially reflect application level traffic between the initiator agent and the target agent.

2. The method of claim 1 wherein forwarding each measurement packet in the measurement packet group to a target agent comprises, for each measurement packet:
generating a measurement transmit timestamp for that measurement packet;
inserting the measurement transmit timestamp as the measurement performance metric into the measurement packet, the measurement transmit timestamp allowing the target agent to compute a measurement packet one way travel time between the initiator agent and the target agent upon receipt of that measurement packet by the target agent; and
transmitting the measurement packet containing the sequence number for that measurement packet, the group count, and the measurement transmit timestamp to the target agent.

3. The method of claim 2 wherein receiving each response packet in the response packet group at the initiator agent comprises, for each response packet:
   receiving the response packet at the initiator device;
   generating a response receipt timestamp for the response packet;
   obtaining, within the response packet, a target processing timestamp as the at least one target performance metric calculated by the target agent, the target processing timestamp indicating a time at which the target agent processed a measurement packet of the measurement packet group to produce the response packet, the response receipt timestamp and the target processing timestamp allowing the initiator agent to compute a one way travel time for packets transmitted between the target agent and the initiator agent upon receipt of that response packet by the initiator agent.

4. The method of claim 3 wherein calculating at least one network link metric from the at least one target performance metric in each response packet of the response packet group comprises, for each response packet:
   calculating the at least one network link metric in association with the response packet, the at least one network link metric including at least one of:
      i) a response packet one way travel time between the target agent and the initiator agent as a time difference between the target processing timestamp and the response receipt timestamp; and
      ii) a measurement packet one way travel time between the initiator agent and the target agent as a time difference between the measurement transmit timestamp for a measurement packet that corresponds with the received response packet and the target processing timestamp that the target agent includes within the response packet;
      iii) a round trip travel time for transmission of a measurement packet from the initiator agent to the target agent and receipt of a corresponding response packet transmitted from the target agent to the initiator agent.

5. The method of claim 4 comprising repeating receiving each response packet and calculating at least one network link metric in a sequence for each response packet of the response packet group, such that a respective at least one network link metric is calculated for each response packet.

6. The method of claim 5 wherein calculating the at least one network link metric in association with the response packet comprises:
   calculating an average one way travel time between the initiator agent and the target agent for packets in at least one of measurement packet group and the response packet group; and
   calculating an average round trip travel time for transmission of a measurement packet in the measurement packet group sent from the initiator agent to the target agent and for receipt of corresponding response packets in the response packet group that were transmitted from the target agent to the initiator agent.

7. The method of claim 6 comprising:
   maintaining clock synchronization between the initiator agent and the target agent.

8. The method of claim 6 wherein the measurement packets and the response packets include a packet verification identity including cryptographic information allowing the initiator agent and target agent to verify their identity using a cryptographic verification process; and wherein creating a measurement packet group containing a set of measurement packets comprises, for each measurement packet
   inserting an initiator communications port identity into each measurement packet allowing the target agent to identify a communications port on the initiator agent to which to transmit response packets in response to receiving each measurement packet; and
wherein receiving a response packet group comprises:
   opening a communications port for reception of response packets in the response packet group, the communications port corresponding to the initiator communications port identity specified in the measurement packets of the measurement packet group; and
   identifying a completion event for receipt of the response packet group, and in response to the completion event, closing the communications port to prevent unauthorized communications on the communications port during times when no response packets are expected.

9. The method of claim 1 wherein the at least one packet loss metric includes at least one of:
   a round trip packet loss metric;
   a one way packet loss metric of packets transmitted from the initiator agent to the target agent; and
   a one way packet loss metric of packets transmitted from the target agent to the initiator agent.

10. The method of claim 1 wherein receiving a response packet group comprises:
   receiving a response packet group containing a set of response packets from the target agent, each response packet containing at least one target performance metric calculated by the target agent using the measurement performance metric in a corresponding measurement packet of the measurement packet group, each response packet containing a copy of the measurement sequence number and measurement group count of the corresponding measurement packet.

11. The method of claim 10 comprising:
   for each response packet received, determining which measurement packet forwarded to the target agent resulted in the creation of that response packet by using the copy of the measurement sequence number and measurement group count from that response packet.

12. In an target agent, a method for determining performance of a network link between the target agent and an initiator agent, the method comprising:
   receiving a measurement packet group containing a set of measurement packets, each measurement packet in the measurement packet group containing a respective measurement packet identity relative to other measurement packets in the measurement packet group and containing at least one measurement performance metric associated with the initiator agent, and for each measurement packet:
   generating a target processing timestamp upon receipt of the measurement packet, the target processing timestamp associated with the measurement packet received and indicating a time at which the target agent receives the measurement packet;
   obtaining a measurement group count from the measurement packet, the measurement group count indicating the total number of measurement packets to be received within the measurement packet group;
obtaining a measurement sequence number from that measurement packet, the measurement sequence number indicating the measurement packet identity of that measurement packet relative to a total number of measurement packets to be created within the measurement packet group as indicated by the measurement group count; and obtaining a measurement transmit timestamp as the measurement performance metric from the measurement packet, the measurement transmit timestamp indicating a time at which the initiator agent transmitted the measurement packet to the target agent; calculating at least one target performance metric for each measurement packet received in the measurement packet group, the at least one target performance metric calculated using the measurement performance metric and measurement packet identity from a corresponding measurement packet of the measurement packet group, the at least one target performance metric identifying a packet latency and packet loss metrics for measurement packets transferred between the initiator agent and target agent;

creating a response packet group containing a set of response packets, each response packet containing the at least one target performance metric calculated by the target agent using the measurement performance metric from a corresponding measurement packet of the measurement packet group, wherein creating comprises, for each response packet:

identifying a response sequence number within that response packet; and identifying a response, group count within that response packet, the response group count indicating the total number of response packets to be created within the response packet, group for transmission to the initiator agent; and forwarding each response packet in the response packet group to the initiator agent over a communications network supporting communication between the initiator agent and the target agent;

wherein creating a measurement packet group comprises: for each measurement packet, inserting an amount of payload data into the measurement packet; and wherein each response packet in the response packet group includes a copy of the payload data within a corresponding measurement packet of the measurement packet group, and wherein the method comprises:

repeating creation of each measurement packet, forwarding of each measurement packet of the measurement packet group receiving a response packet group and calculating at least one network link metric in a sequence of multiple iterations, and for each measurement packet group in each iteration in the sequence of iterations, adjusting the amount of payload data inserted into the measurement packet sequence group to identify how the calculated at least one network link metric changes based on the adjusted amount of payload data, at least one of the amounts of payload data inserted into the measurement packet causing an overall size of the measurement packet to substantially reflect application level traffic between the initiator agent and the target agent.

13. The method of claim 12 wherein calculating at least one target performance metric for each measurement packet received in the measurement packet group comprises:

calculating, as the at least one network link metric in association with the measurement packet, a measurement packet one way travel time between the initiator agent and the target agent as a time difference between the measurement transmit timestamp for a measurement packet that corresponds with the received response packet and the target processing timestamp that the target agent generates upon receipt of the measurement packet.

14. The method of claim 12 wherein calculating at least one target performance metric for each measurement packet received in the measurement packet group further comprises:

identifying a completion event for receipt of the measurement packet group, and in response to identifying the completion event:

i) calculating a packet loss metric of packets lost in transmission between the initiator agent and target agent based upon received measurement sequence numbers and a total number of packets in a measurement packet group identified by the measurement group count; and ii) calculating an average one way travel time for measurement packets transmitted between the initiator agent and the target agent in the measurement packet group by averaging the measurement packet one way travel time across a number of measurement packets received.

15. The method of claim 14 wherein creating a response packet group containing a set of response packets comprises:

for each measurement packet received in the measurement packet group:

i) copying the contents of that measurement packet into a corresponding response packet generated and corresponding to that measurement packet;

ii) inserting the target processing timestamp into the response packet;

iii) inserting at least one of the packet loss metric and the average one way travel time for measurement packets as the at least one target performance metric within the response packet; and performing the operation of forwarding that response packet of the response packet group to the initiator agent.

16. An initiator agent computer system comprising: a memory; a processor; a communications interface; and an interconnection mechanism coupling the memory, the processor and the communications interface;

wherein the memory is encoded with an initiator agent application that when performed on the processor, provides an initiator agent process that when executed on the processor determines performance of a network link between the initiator agent computer system and a target agent computer system by causing the initiator agent computer system to perform the operations of:

creating a measurement packet group containing a set of measurement packets, each measurement packet in the measurement packet group containing a respective measurement packet identity relative to other measurement packets in the measurement packet group and containing at least one measurement performance metric associated with the initiator agent, by, for each measurement packet:

calculating a measurement sequence number for that measurement packet that indicates the measurement packet identity relative to a total number of measurement packets to be created within the measurement packet group;

inserting the measurement sequence number for that measurement packet into the measurement packet; and inserting a measurement group count into the measurement packet, the measurement group count indicating the total number of measurement packets to be created within the measurement packet group, the measurement sequence number and measurement group count allowing the target agent to compute a packet loss metric of measurement packets within the measurement packet group;

forwarding each measurement packet in the measurement packet group to a target agent over a communications network supporting communication between the initiator agent and the target agent;

repeating creation of each measurement packet and forwarding of each measurement packet in a sequence for each measurement packet of the measurement packet group, such that measurement packets in the measurement packet group are forwarded to the target agent in a sequence;

receiving a response packet group containing a set of response packets from the target agent, each response packet containing at least one target performance metric calculated by the target agent using the measurement performance metric in a corresponding measurement packet of the measurement packet group, wherein receiving comprises, for each response packet:

identifying a response sequence number within that response packet; and identifying a response, group count within that response packet, the response, group count indicating the total number of response packets to be created within the response packet group for transmission to the initiator agent; and calculating at least one network link metric from the at least one target performance metric in each response packet of the response packet group, the at least one network link metric identifying a packet latency and packet loss rate between the initiator agent and target agent, wherein calculating comprises:

identifying a completion event for receipt of the response packet, group, and in response to identifying the completion event, determining at least one packet loss metric of packets lost in transmission between the initiator agent and target agent based upon received response sequence numbers and a total number of packets in a packet, group identified by the response, group count;

wherein when the initiator agent process causes the initiator agent computer system to perform the operation of creating a measurement packet group, the initiator agent process causes the initiator agent computer system to perform the operation of:

for each measurement packet, inserting an amount of payload data into the measurement packet; and wherein each response packet in the response packet group includes a copy of the payload data within a corresponding measurement packet of the measurement packet group, and wherein the initiator agent process causes the initiator agent computer system to perform the operation of:

repeating creation of each measurement packet, forwarding of each measurement packet of the measurement packet group, receiving a response packet group and calculating at least one network link metric in a sequence of multiple iterations, and for each measurement packet group in each iteration in the sequence of iterations, adjusting the amount of payload data inserted into the measurement packet sequence group to identify how the calculated at least one network link metric changes based on the adjusted amount of payload data, at least one of the amounts of payload data inserted into the measurement packet causing an overall size of the measurement packet to substantially reflect application level traffic between the initiator agent and the target agent.

17. The initiator agent computer system of claim 16 wherein when the initiator agent process causes the initiator agent computer system to perform the operation of forwarding each measurement packet in the measurement packet group to a target agent, the initiator agent process causes the initiator agent computer system to perform the operations of, for each measurement packet:

generating a measurement transmit timestamp for that measurement packet;

inserting the measurement transmit timestamp as the measurement performance metric into the measurement packet, the measurement transmit timestamp allowing the target agent to compute a measurement packet one way travel time between the initiator agent and the target agent upon receipt of that measurement packet by the target agent; and transmitting the measurement packet containing the sequence number for that measurement packet, the group count, and the measurement transmit timestamp to the target agent.

18. The initiator agent computer system of claim 17 wherein when the initiator agent process causes the initiator agent computer system to perform the operation of receiving each response packet in the response packet group at the initiator agent, the initiator agent process causes the initiator agent computer system to perform the operation of, for each response packet:

receiving the response packet at the initiator device;

generating a response receipt timestamp for the response packet;

obtaining, within the response packet, a target processing timestamp as the at least one target performance metric calculated by the target agent, the target processing timestamp indicating a time at which the target agent processed a measurement packet of the measurement packet group to produce the response packet, the response receipt timestamp and the target processing timestamp allowing the initiator agent to compute a one way travel time for packets transmitted between the target agent and the initiator agent upon receipt of that response packet by the initiator agent.

19. The initiator agent computer system of claim 18 wherein when the initiator agent process causes the initiator agent computer system to perform the operation of calculating at least one network link metric from the at least one target performance metric in each response packet of the response packet group, the initiator agent process causes the initiator agent computer system to perform the operations of, for each response packet:

calculating the at least one network link metric in association with the response packet, the at least one network link metric including at least one of:

i) a response packet one way travel time between the target agent and the initiator agent as a time difference between the target processing timestamp and the response receipt timestamp; and ii) a measurement packet one way travel time between the initiator agent and the target agent as a time difference between the measurement transmit timestamp for a measurement packet that corresponds with the received response packet and the target processing timestamp that the target agent includes within the response packet;

iii) a round trip travel time for transmission of a measurement packet from the initiator agent to the target agent and receipt of a corresponding response packet transmitted from the target agent to the initiator agent.

20. The initiator agent computer system of claim 19 wherein the initiator agent process causes the initiator agent computer system to perform the operation of repeating receiving each response packet and calculating at least one network link metric in a sequence for each response packet of the response packet group, such that a respective at least one network link metric is calculated for each response packet.

21. The initiator agent computer system of claim 20 wherein when the initiator agent process causes the initiator agent computer system to perform the operation of calculating the at least one network link metric in association with the response packet, the initiator agent process causes the initiator agent computer system to perform the operation of:
calculating an average one way travel time between the initiator agent and the target agent for packets in at least one of measurement packet group and the response packet group; and
calculating an average round trip travel time for transmission of a measurement packet in the measurement packet group sent from the initiator agent to the target agent and for receipt of corresponding response packets in the response packet group that were transmitted from the target agent to the initiator agent.

22. The initiator agent computer system of claim 21 wherein the initiator agent process causes the initiator agent computer system to perform the operation of:
maintaining clock synchronization between the initiator agent and the target agent.

23. The initiator agent computer system of claim 21 wherein the measurement packets and the response packets include a packet verification identity including cryptographic information allowing the initiator agent and target agent to verify their identity using a cryptographic verification process; and
wherein when the initiator agent process causes the initiator agent computer system to perform the operation of creating a measurement packet group containing a set of measurement packets, the initiator agent process causes the initiator agent computer system to perform the operation of, for each measurement packet:
inserting an initiator communications port identity into each measurement packet allowing the target agent to identify a communications port on the initiator agent to which to transmit response packets in response to receiving each measurement packet; and
wherein when the initiator agent process causes the initiator agent computer system to perform the operation of receiving a response packet group, the initiator agent process causes the initiator agent computer system to perform the operations of:
opening a communications port for reception of response packets in the response packet group, the communications port corresponding to the initiator communications port identity specified in the measurement packets of the measurement packet group; and
identifying a completion event for receipt of the response packet group, and in response to the completion event, closing the communications port to prevent unauthorized communications on the communications port during times when no response packets are expected.

24. The initiator agent computer system of claim 16 wherein the at least one packet loss metric includes at least one of:
a round trip packet loss metric;
a one way packet loss metric of packets transmitted from the initiator agent to the target agent; and
a one way packet loss metric of packets transmitted from the target agent to the initiator agent.

25. An target agent computer system comprising:
a memory;
a processor;
a communications interface; and
an interconnection mechanism coupling the memory, the processor and the communications interface;
wherein the memory is encoded with a target agent application that when performed on the processor, provides a target agent process that when executed on the processor determines performance of a network link between an initiator agent computer system and the target agent computer system by causing the target agent computer system to perform the operations of:
receiving, via the communications interface, a measurement packet group containing a set of measurement packets, each measurement packet in the measurement packet group containing a respective measurement packet identity relative to other measurement packets in the measurement packet group and containing at least one measurement performance metric associated with the initiator agent, and for each measurement packet:
generating a target processing timestamp upon receipt of the measurement packet, the target processing timestamp associated with the measurement packet received and indicating a time at which the target agent receives the measurement packet;
obtaining a measurement group count from the measurement packet, the measurement group count indicating the total number of measurement packets to be received within the measurement packet group;
obtaining a measurement sequence number from that measurement packet, the measurement sequence number indicating the measurement packet identity of that measurement packet relative to a total number of measurement packets to be created within the measurement packet group as indicated by the measurement group count; and
obtaining a measurement transmit timestamp as the measurement performance metric from the measurement packet, the measurement transmit timestamp indicating a time at which the initiator agent transmitted the measurement packet to the target agent;
calculating at least one target performance metric for each measurement packet received in the measurement packet group, the at least one target performance metric calculated using the measurement performance metric and measurement packet identity from a corresponding measurement packet of the measurement packet group, the at least one target performance metric identifying a packet latency and packet loss metrics for measurement packets transferred between the initiator agent and target agent;
creating a response packet group containing a set of response packets, each response packet containing the at least one target performance metric calculated by the target agent using the measurement performance metric from a corresponding measurement packet of the measurement packet group, wherein creating comprises, for each response packet:
identifying a response sequence number within that response packet; and identifying a response group count within that response packet, the response, group count indicating the total number of response packets to be created within the response packet, group for transmission to the initiator agent; and forwarding, via the communications interface, each response packet in the response packet group to the initiator agent over a communications network supporting communication between the initiator agent and the target agent;
  wherein when the initiator agent process causes the initiator agent computer system to perform the operation of creating a measurement packet group, the initiator agent process causes the initiator agent computer system to perform the operation of:
for each measurement packet, inserting an amount of payload data into the measurement packet; and
  wherein each response packet in the response packet group includes a copy of the payload data within a corresponding measurement packet of the measurement packet group, and wherein the initiator agent process causes the initiator agent computer system to perform the operation of:
  repeating creation of each measurement packet, forwarding of each measurement packet of the measurement packet group, receiving a response packet group and calculating at least one network link metric in a sequence of multiple iterations, and for each measurement packet group in each iteration in the sequence of iterations, adjusting the amount of payload data inserted into the measurement packet sequence group to identify how the calculated at least one network link metric changes based on the adjusted amount of payload data, at least one of the amounts of payload data inserted into the measurement packet causing an overall size of the measurement packet to substantially reflect application level traffic between the initiator agent and the target agent.

26. The target agent computer system of claim 25 wherein when the target agent process causes the target agent computer system to perform the operation of calculating at least one target performance metric for each measurement packet received in the measurement packet group, the target agent process causes the target agent computer system to perform the operation of:
  calculating, as the at least one network link metric in association with the measurement packet, a measurement packet one way travel time between the initiator agent and the target agent as a time difference between the measurement transmit timestamp for a measurement packet that corresponds with the received response packet and the target processing timestamp that the target agent generates upon receipt of the measurement packet.

27. The target agent computer system of claim 25 wherein when the target agent process causes the target agent computer system to perform the operation of calculating at least one target performance metric for each measurement packet received in the measurement packet group further, the target agent process causes the target agent computer system to perform the operations of:
  identifying a completion event for receipt of the measurement packet group, and in response to identifying the completion event:
    i) calculating a packet loss metric of packets lost in transmission between the initiator agent and target agent based upon received measurement sequence numbers and a total number of packets in a measurement packet group identified by the measurement group count; and
    ii) calculating an average one way travel time for measurement packets transmitted between the initiator agent and the target agent in the measurement packet group by averaging the measurement packet one way travel time across a number of measurement packets received.

28. The target agent computer system of claim 27 wherein when the target agent process causes the target agent computer system to perform the operation of creating a response packet group containing a set of response packets wherein when the target agent process causes the target agent computer system to perform the operations of:
  for each measurement packet received in the measurement packet group:
    i) copying the contents of that measurement packet into a corresponding response packet generated and corresponding to that measurement packet;
    ii) inserting the target processing timestamp into the response packet;
    iii) inserting at least one of the packet loss metric and the average one way travel time for measurement packets as the at least one target performance metric within the response packet; and
  performing the operation of forwarding that response packet of the response packet group to the initiator agent.

* * * * *